United States Patent
Xu et al.

(10) Patent No.: US 11,768,330 B2
(45) Date of Patent: Sep. 26, 2023

(54) LIGHT GUIDE COMBINER WITH INCREASED FIELD OF VIEW (FOV) AND EYEBOX EFFICIENCY FOR ENHANCED REALITY APPLICATIONS

(71) Applicant: Meta Platforms Technologies, LLC, Menlo Park, CA (US)

(72) Inventors: Miaomiao Xu, Redmond, WA (US); Brian Wheelwright, Sammamish, WA (US); Ying Geng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 106 days.

(21) Appl. No.: 17/485,064

(22) Filed: Sep. 24, 2021

(65) Prior Publication Data

US 2023/0098034 A1    Mar. 30, 2023

(51) Int. Cl.
G02B 6/293    (2006.01)
G02B 27/01    (2006.01)
G02B 27/30    (2006.01)

(52) U.S. Cl.
CPC ..... *G02B 6/29301* (2013.01); *G02B 27/0101* (2013.01); *G02B 27/0172* (2013.01); *G02B 27/30* (2013.01); *G02B 2027/0123* (2013.01)

(58) Field of Classification Search
CPC ............ G02B 27/0101; G02B 27/0172; G02B 27/30; G02B 6/29301; G02B 2027/0123
See application file for complete search history.

(56) References Cited

U.S. PATENT DOCUMENTS 9,335,548 B1    5/2016  Cakmakci et al.
2018/0284460 A1*  10/2018  Cheng ................ G02B 27/0172

FOREIGN PATENT DOCUMENTS

WO    2020146559 A1    7/2020

OTHER PUBLICATIONS

Kuo G., et al., "High Resolution Étendue Expansion for Holographic Displays," ACM Transactions on Graphics, Jul. 2020, vol. 39, No. 4, Article 66, pp. 66:1-66:14.
EPO—International Search report and Written Opinion for International Application No. PCT/US2022/043919, dated Jan. 4, 2023, 9 pages.
Jia S., et al., "Investigation of Expanding the Field of View in the Near-Eye Display," SPIE Proceedings; [Proceedings of SPIE ISSN 0277-786X], SPIE, vol. 11434, Mar. 12, 2020, 7 pages.

* cited by examiner

*Primary Examiner* — Daniel Petkovsek
(74) *Attorney, Agent, or Firm* — McDermott Will & Emery LLP

(57) ABSTRACT

A device includes an array of light emitters configured to generate multiple light beams to form an image, the image having a field of view and a planar waveguide having an edge configured to receive multiple light beams from the array of light emitters, each light beam associated with a portion of the field of view. The device also includes a lens array comprising multiple lenses linearly extended to overlap an edge portion of the planar waveguide, the lenses optically coupling the light beams into the planar waveguide, and one or more output couplers in the planar waveguide configured to direct the light beams into an eyebox, wherein the eyebox forms an area that includes a pupil of a viewer of the image.

19 Claims, 15 Drawing Sheets

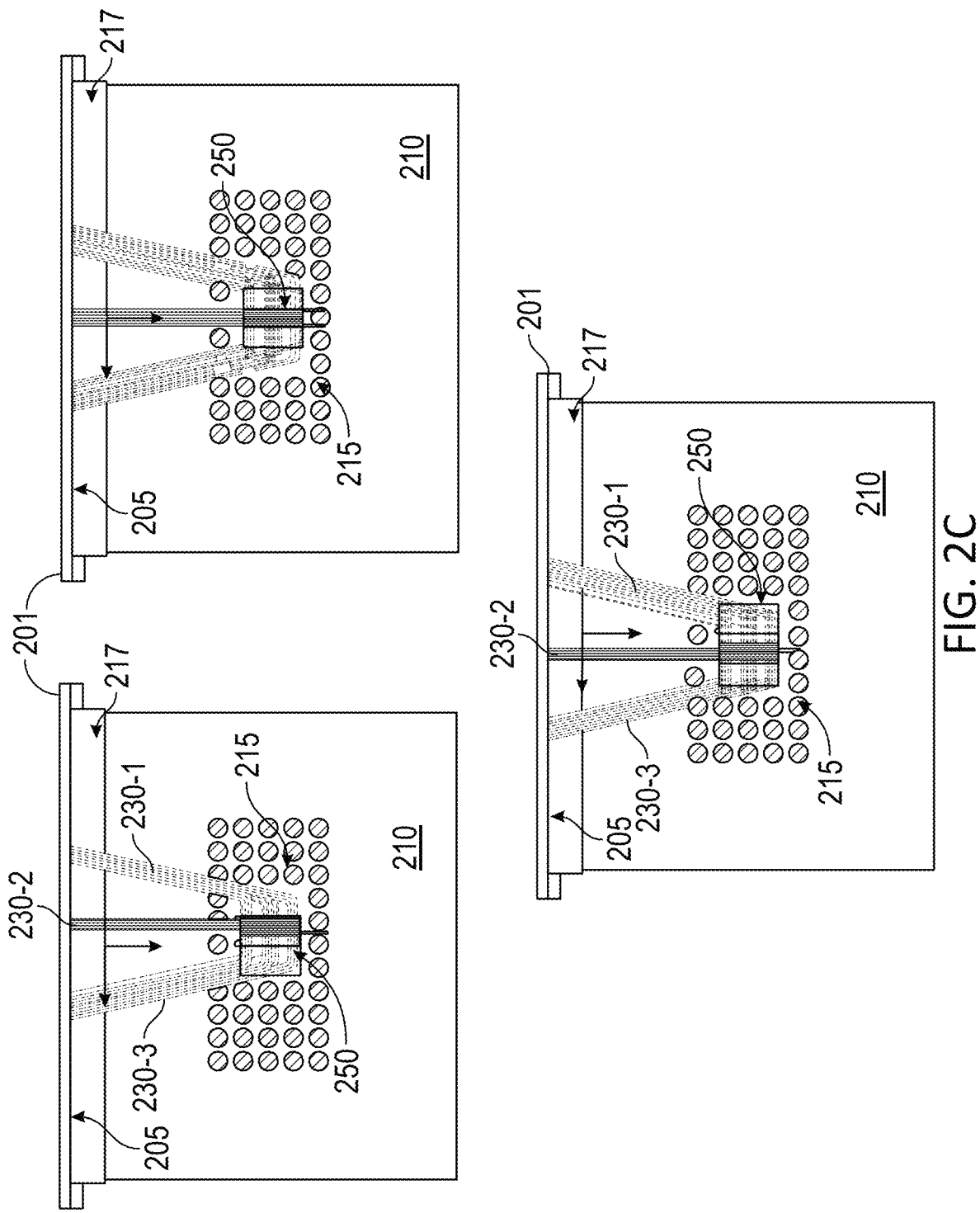

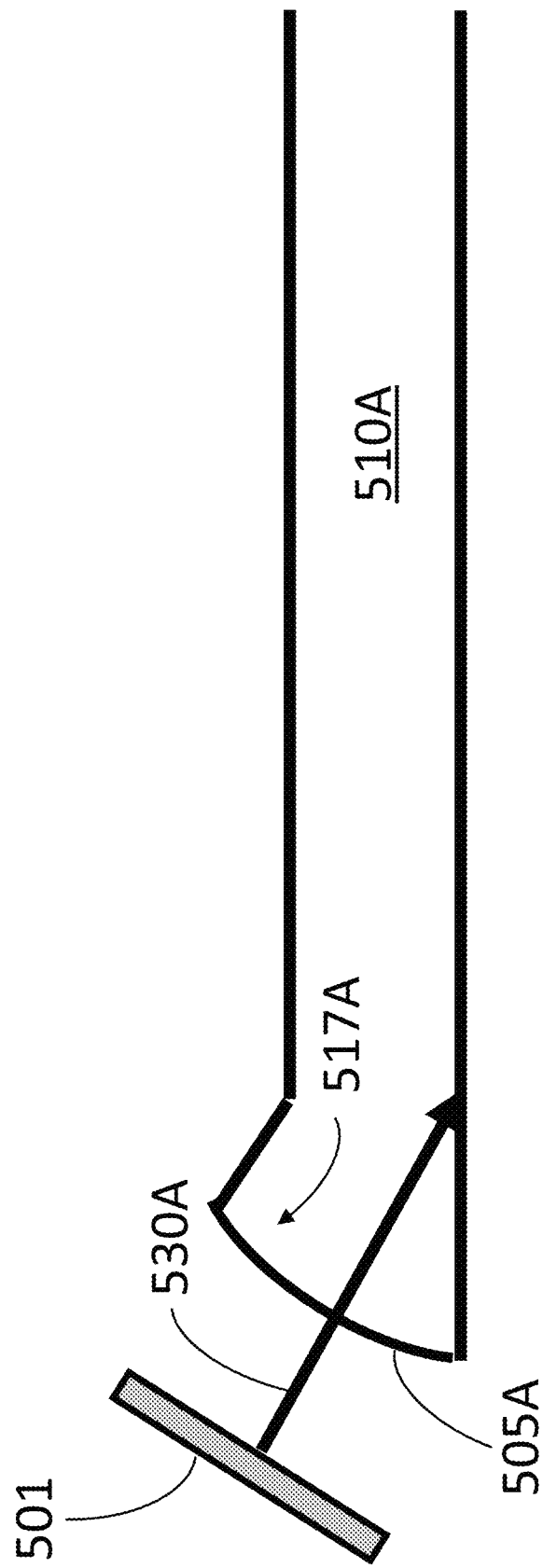

LIGHT GUIDE COMBINER WITH INCREASED FIELD OF VIEW (FOV) AND EYEBOX EFFICIENCY FOR ENHANCED REALITY APPLICATIONS

BACKGROUND

Field

The present disclosure is related to enhanced reality devices with increased field of view (FOV) and light coupling efficiency, under typical optical constraints. More specifically, the present disclosure is related to a light guide combiner that increases the FOV for a reduced display size in a compact design that enhances eyebox efficiency in enhanced reality devices.

Related Art

In enhanced reality devices, it is desirable to provide a wide FOV to the users from a small display device to enhance the immersive reality experience for users in less bulky applications. Current approaches couple light from an array of light emitters into a planar waveguide that delivers the light to the viewer via an eyebox that is typically larger than the viewer's pupil. The coupling of light from the display to the planar waveguide is performed by a large lens collimator that, in addition to being bulky, has a longer focal length that forces a larger display to couple light into a bigger eyebox at a reduced FOV aperture. This approach, in addition to curtailing the FOV achievable by the system, results in an inefficient use of light at the eyebox, where a large proportion of light beams misses the viewer's pupil at any given time.

BRIEF DESCRIPTION OF THE DRAWINGS

FIGS. 2A-2C illustrate a micro-lens strip coupling light from a display into a planar waveguide in a headset for enhanced reality applications, according to some embodiments.

FIGS. 5A-5B illustrate micro-lens strips formed within the edge of a planar waveguide to couple light from a display therein, according to some embodiments.

In the figures, elements labeled with the same or similar reference numeral have the same or similar features or description, unless stated otherwise.

SUMMARY

Figure 1:
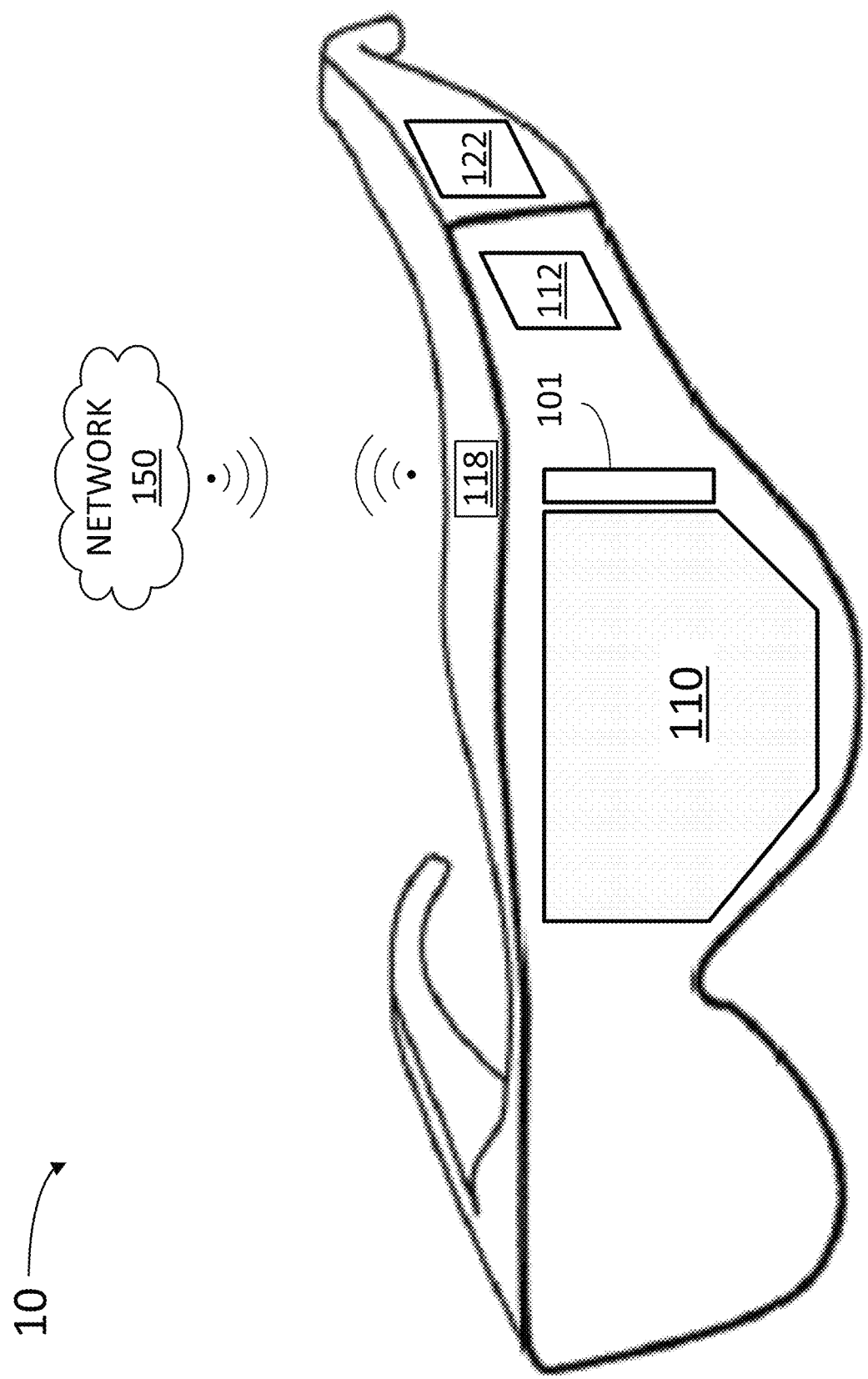
FIG. 1 illustrates a headset for enhanced reality applications, according to some embodiments.

In a first embodiment, a device, includes an array of light emitters configured to generate multiple light beams to form an image, the image having a field of view, and a planar waveguide having an edge configured to receive multiple light beams from the array of light emitters, each light beam associated with a portion of the field of view. The device also includes a lens array including multiple lenses linearly extended to overlap an edge portion of the planar waveguide, the lenses optically coupling the light beams into the planar waveguide, and one or more output couplers in the planar waveguide configured to direct the light beams into an eyebox, wherein the eyebox forms an area that includes a pupil of a viewer of the image.

In a second embodiment, a headset for enhanced reality includes one or more processors, and a memory storing instructions. The headset also includes an array of light emitters configured to generate multiple light beams to form an image, the image including a field of view, a planar waveguide having an edge configured to receive multiple light beams from the array of light emitters, each light beam associated with a portion of the field of view, and a lens array including multiple lenses linearly extended to overlap an edge portion of the planar waveguide, the lenses optically coupling the light beams into the planar waveguide. The headset also includes one or more output couplers in the planar waveguide configured to direct the light beams into an eyebox, wherein the eyebox forms an area that includes a pupil of a viewer of the image, wherein the one or more processors execute the instructions to cause the array of light emitters to generate the light beams, and the output couplers in the planar waveguide to direct the light beams into the eyebox.

In a third embodiment, a method, includes collecting multiple light beams from a display, the light beams forming an image in an enhanced reality device, collimating the light beams, directing the light beams to couple into a planar waveguide, and causing the light beams to exit the planar waveguide and pass through an eyebox delimiting an area that includes a pupil of a user of the enhanced reality device.

In yet other embodiments, a system includes a first means for storing instructions and a second means for executing the instructions. The system also includes an array of light emitters configured to generate multiple light beams to form an image, the image including a field of view, a planar waveguide having an edge configured to receive multiple light beams from the array of light emitters, each light beam associated with a portion of the field of view, and a lens array including multiple lenses linearly extended to overlap an edge portion of the planar waveguide, the lenses optically coupling the light beams into the planar waveguide. The system also includes one or more output couplers in the planar waveguide configured to direct the light beams into an eyebox, wherein the eyebox forms an area that includes a pupil of a viewer of the image, wherein the second means execute the instructions to cause the array of light emitters to generate the light beams, and the output couplers in the planar waveguide to direct the light beams into the eyebox.

DETAILED DESCRIPTION

Embodiments of a peripheral display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments as disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head mounted display (HMD) connected to a host computer system, a standalone HMD, a mobile device or computing system, or any other hardware platform capable of providing artificial reality content to one or more viewers.

In some embodiments of the disclosure, "near-eye" may be defined as including an optical element that is configured to be placed within 35 mm of an eye of a user while a near-eye optical device such as an HMD (head mounted display) is being utilized.

In VR (virtual reality) displays, there are limited options for extending the field of view to cover the human visual field. Some options include filling the periphery with sparse LEDs or a bare display panel, but these both lack in resolution even compared to the low resolution of the human eye at large angles. Other approaches may include tiling (e.g., 'split lens' architectures). With enough tiles, this provides excellent coverage, but over-performs in resolution and is bulky.

To resolve the above problems, some embodiments as disclosed herein include coupling light into a planar waveguide in the enhanced reality device via a micro-lens strip (MLS) in close proximity to a high aspect ratio array source that provides a wide FOV image. The MLS extends along an edge of the planar waveguide overlapping the array source. Each of the lenslets in the MLS directs a different portion of the wide FOV of the image towards an output coupler. Accordingly, the output coupler captures the wide FOV of the image from all the lenslets in the MLS and directs it towards the eyebox. In some embodiments, the array source is a light field display, enlarged in at least one dimension to provide multiple, tiled elemental images, each of which is conveyed through a planar waveguide by a lenslet from the MLS which is in close proximity with the elemental image. The trade-off of using a larger display size is compensated by the compactness of having the MLS in close proximity to the array source (or display) using lenslets with sufficiently low focal length, f. In some embodiments, the lower angular resolution resulting from a small focal length, f, may be compensated by using array sources with higher pixel count (pixel-per-inch, PPI).

FIG. 1 illustrates a headset 10 for enhanced reality applications, according to some embodiments. Headset 10 may include one or more processors 112, a memory 122 storing instructions and data, and a communications module 118 configured to couple processor 112 and memory 122 with a network 150. Communications module 118 may include hardware and software configured according to networking protocols, including radio and wireless antennas and associated digital and/or analog circuitry, such as Bluetooth, Wi-Fi, near field contact (NFC), and other radio-frequency (RF) communication schemes, including ultrasound. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Headset 10 may also include a display 101 and a planar waveguide 110, configured to provide an image to the user of headset 10, the image including an enhanced field of view. In some embodiments, display 101 is an array of light emitters configured to generate multiple light beams to form the image for the user. While display 101 and planar waveguide 110 are shown for a left eyepiece in headset 10, for simplicity, it is understood that in some embodiments a duplicate display 101 and planar waveguide 110 may be included for the right eyepiece in headset 10.

Figure 2A:
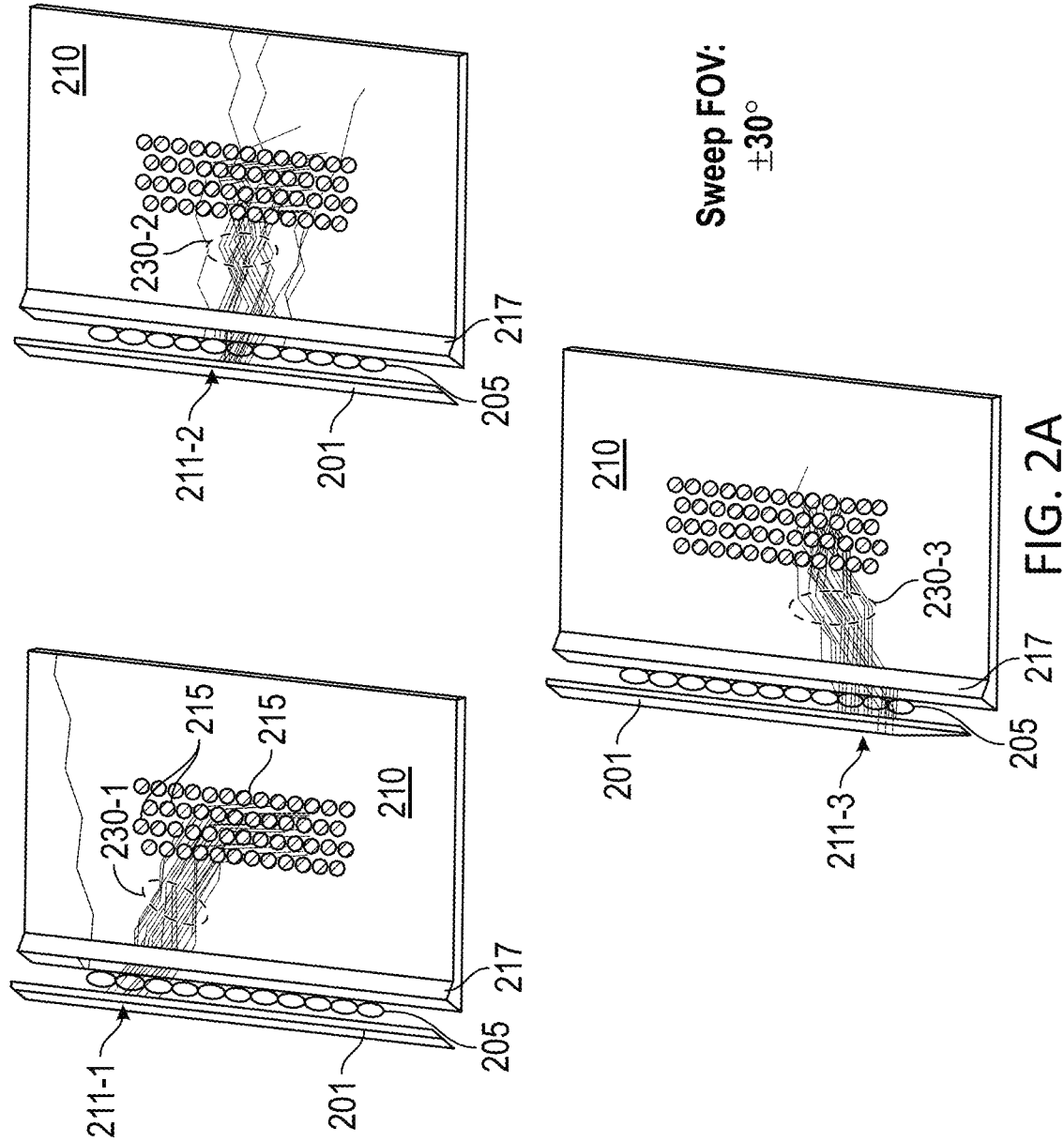
Figure 2B:
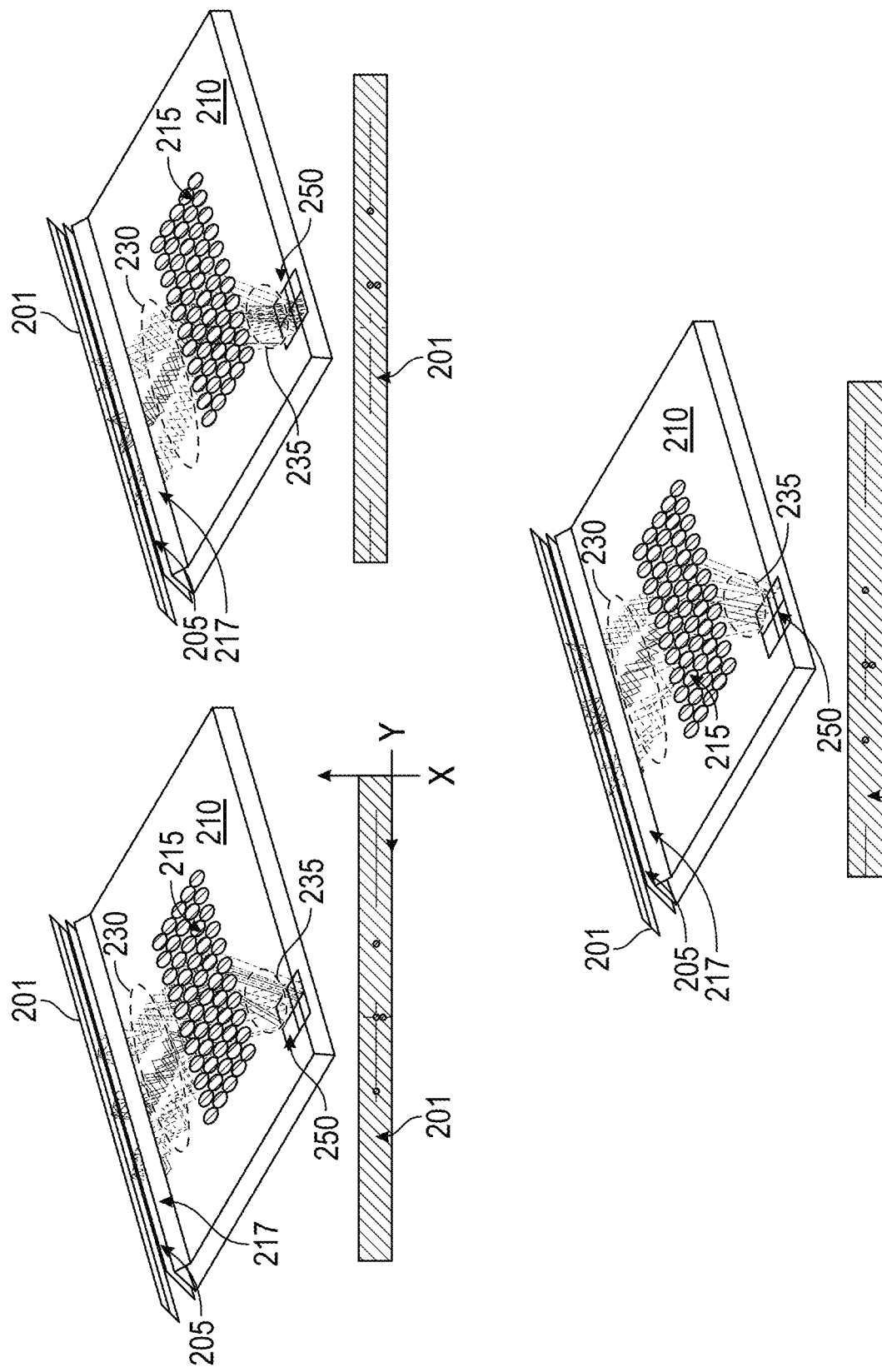

FIGS. 2A-2C illustrate a micro-lens strip (MLS) 205 coupling light from a display 201 into a planar waveguide 210 in a headset for enhanced reality applications (e.g., headset 10), according to some embodiments. In some embodiments, display 201 includes an array of multiple light emitters 211-1, 211-2, and 211-3 (hereinafter, collectively referred to as "light emitters 211"). Planar waveguide 210 includes an edge, or interface 217, configured to receive multiple light beams from light emitters 211, each light beam associated with a portion of the field of view in the image to be provided to the headset user. Without loss of generality, a two-dimensional, Cartesian coordinate plane (XY) is chosen for display 201, wherein the X-coordinate (abscissae) is substantially perpendicular to planar waveguide 210, and the Y-coordinate (ordinates) runs along the side of interface 217. In some embodiments, MLS 205 is a lens array having multiple lenses linearly extended to overlap an edge portion of the planar waveguide along interface 217. The lenses in MLS 205 optically couple light beams 230-1, 230-2, and 230-3 (hereinafter, collectively referred to as "light beams 230") into planar waveguide 210. In some embodiments, one or more processors execute instructions stored in a memory (e.g., processor 112 and memory 122) to cause display 201 to generate light beams 230. One or more output couplers 215 in planar waveguide 210 direct light beams 230 out of planar waveguide 210 by directing light beams 230 towards an edge of planar waveguide 210 with an incidence angle greater than a total internal reflection angle.

FIG. 2A illustrates a first group of light beams 230-1 generated by a first group of light emitters (pixels) 211-1 in display 201. For illustrative purposes, first group of pixels 211-1 may correspond to an edge of the image in display 201 forming a portion of the FOV at a wide angle of view, for the user of the headset. A second group of light beams 230-2 from a second group of pixels 211-2 in display 201 may correspond to a different portion of the FOV at a more central or direct angle of view for the user of the headset. A third group of light beams 230-3 from a third group of pixels 211-3 in display 201 may correspond to a third portion of the FOV at a wide angle of view for the user of the headset.

FIG. 2B illustrates light beams 230 being directed by output couplers 215 into light beams 235 through an eyebox 250. Eyebox 250 is a portion of space delimiting an area where the pupil of the headset user is expected to be at any given time. Light beams 235 are divided into three groups, each group corresponding to each portion of the FOV from different angle of views, according to light beams 230-1, 230-2, and 230-3. In some embodiments, ensuring that light beams 235 include all, or at least a wide range, of angles of view from the image in display 201 is desirable, so that the headset user has a wide FOV of the image. In addition, it is desirable that light beams 230 generated from the same pixel or closely located pixels in display 201 (e.g., the pixels within either one of group of pixels 211-1, 211-2, and 211-3), and arriving at the plane of eyebox 250 at different incidence angles, do not overlap within the area of eyebox 250, as this may result in cross-talk for the headset user.

FIG. 2C illustrates eyebox 250 forming an area that includes a pupil of a viewer of the image. In some embodiments, the one or more processors execute instructions stored in the memory to cause output couplers 215 to direct the light beams into eyebox 250 (e.g., processor 112 and memory 122). By activating distinct sets of output couplers 215, each of the different light beams 230 from different portions of the FOV are transmitted through eyebox 250, thus ensuring a wide angle FOV for the headset user.

Figure 3:
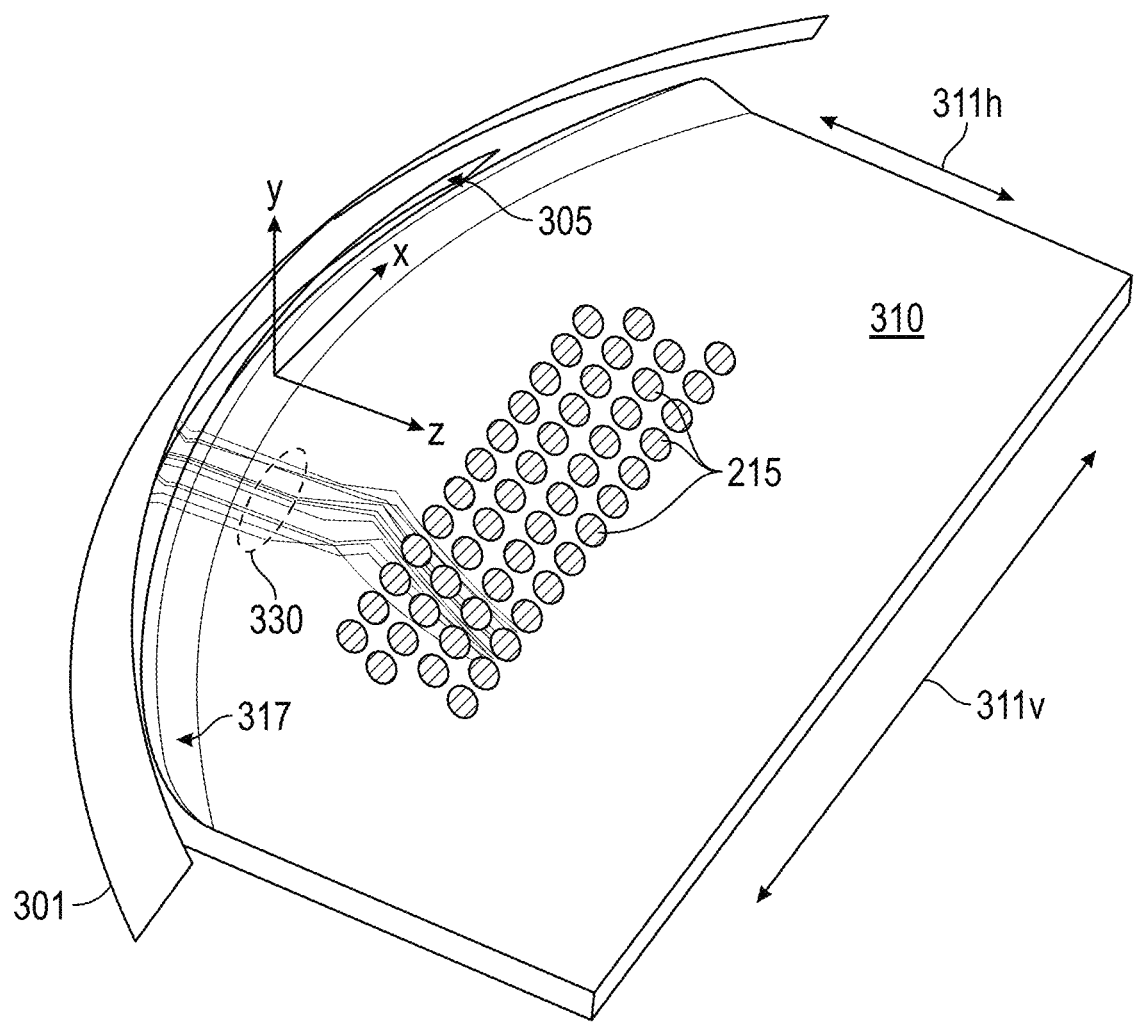
FIG. 3 illustrates a micro-lens strip coupling light from a curved display into a planar waveguide in an enhanced reality device, according to some embodiments.

FIG. 3 illustrates a micro-lens strip 305 coupling light from a curved display 301 into a planar waveguide 310 in a headset for enhanced reality applications (e.g., headset 10), according to some embodiments. In some embodiments, interface 317 is curved to follow the curvature of display 301. Output couplers 215 direct light beams 330 from curved display 301 outside of planar waveguide 310.

Curved MLS 305 configuration increases the FOV capture from the far field elemental images (e.g., pixel groups on the edges of curved display 301) by reducing the angle of incidence of the light beams on the lenslets in curved MLS 305 that are closer to each pixel group. In some embodiments, curved MLS 305 may provide an enhanced FOV in a horizontal direction (311h) of ±30° and in a vertical direction (311v) of ±60° in a more compact form factor, as the edges of curved array 305 are closer to the center of planar waveguide 310 than they would in a straight array (cf. display 201).

Figure 4:
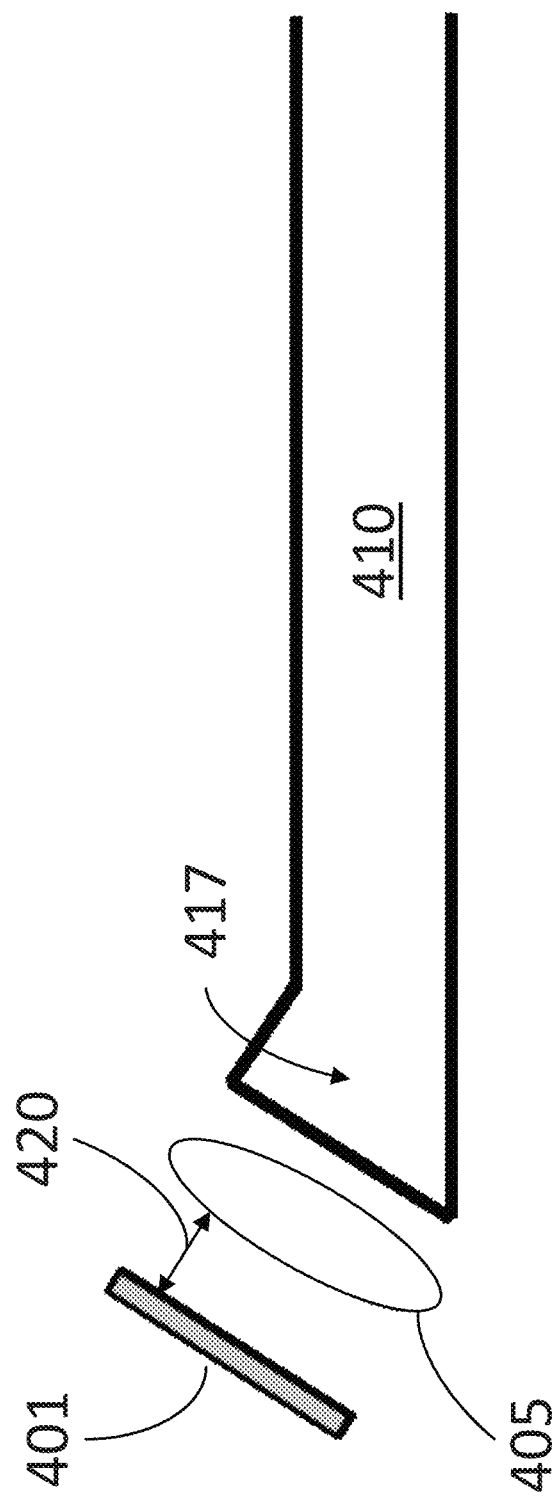
FIG. 4 illustrates a micro-lens strip for coupling light from a display into a separate planar waveguide in a headset for enhanced reality applications, according to some embodiments.

FIG. 4 illustrates MLS 405 for coupling light from a display 401 into a separate planar waveguide 410 in a headset for enhanced reality applications (e.g., headset 10), according to some embodiments. Waveguide 410 includes coupling interface 417, and is separated from a multi-lenslet array 405 by a distance 420. A display 401 provides the image to multi-lenslet array 405. In some embodiments, distance 420 may be approximately equal to a focal length of each of the lenses in MLS 405 (assumed to include multiple lenses having the same or similar focal length).

Figure 5B:
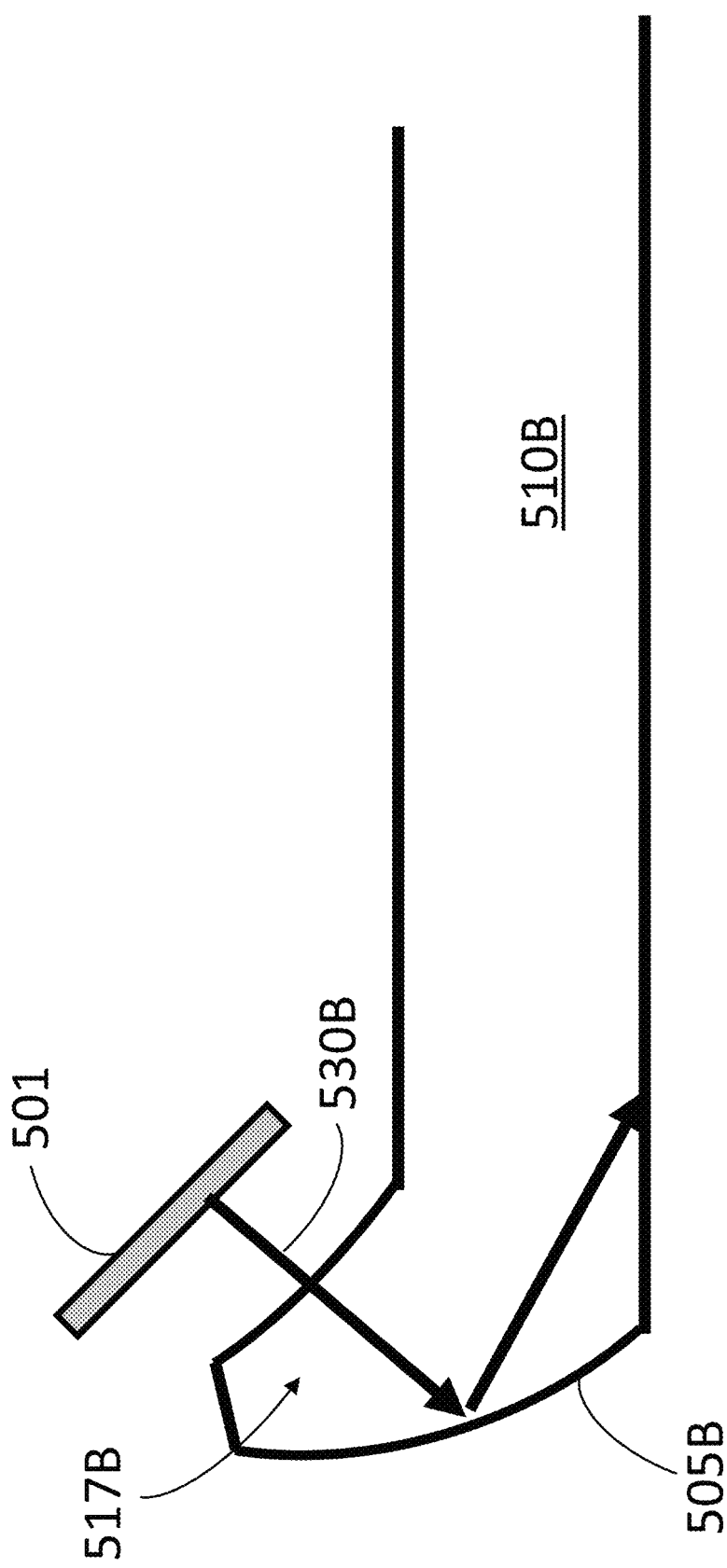

FIGS. 5A-5B illustrate MLS 505A and 505B (hereinafter, collectively referred to as MLS 505) formed within interfaces 517A and 517B (hereinafter, collectively referred to as "interfaces 517") of planar waveguides 510A and 510B (hereinafter, collectively referred to as "planar waveguides 510"), to couple light beams 530A and 530B (hereinafter, collectively referred to as "light beams 530"), respectively, from a display 501, according to some embodiments.

FIG. 5A illustrates a design wherein interface 517A has a single curved surface, and therefore light beam 530A from display 501 only encounters one surface interface to couple into planar waveguide 510A.

FIG. 5B illustrates a more compact design (along the length of planar waveguide 510B) wherein light beam 530B goes through two surfaces before coupling into planar waveguide 510B. While this design has a deeper form factor (relative to a direction perpendicular to planar waveguide 510B), it offers the advantage of using two refractive surfaces to apply aberration correction and other focusing properties to light beams 530B.

Figure 6:
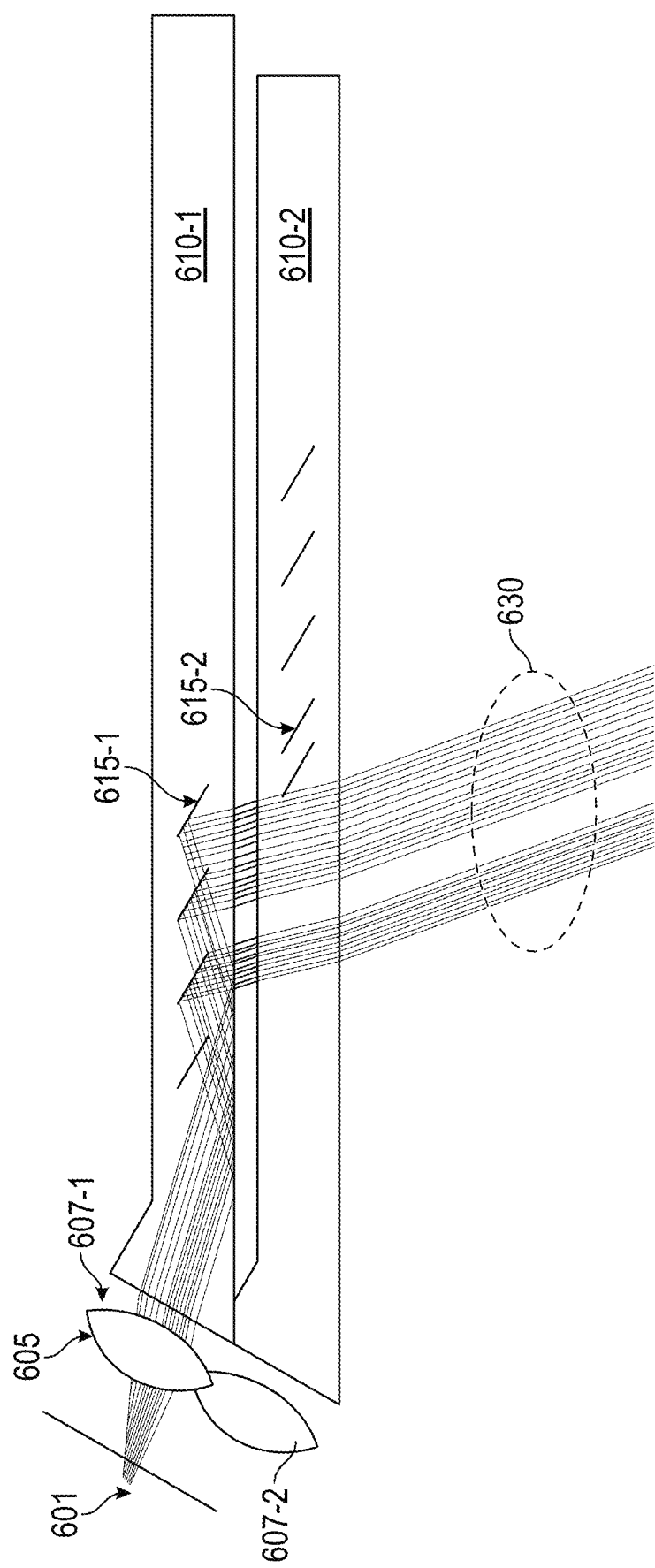
FIG. 6 illustrates a micro-lens strip for coupling light from a display into two planar waveguides in a headset for enhanced reality applications, according to some embodiments.

FIG. 6 illustrates an MLS 605 for coupling light from a display into two planar waveguides 610-1 and 610-2 (hereinafter, collectively referred to as "planar waveguides 610") in a headset for enhanced reality applications (e.g., headset 10), according to some embodiments. Accordingly, MLS 605 may include two rows 607-1 and 607-2 (hereinafter, collectively referred to as "rows 607") of micro-lenses. Each of rows 607 may be configured to couple a different section of a display 601 in a second direction, substantially perpendicular to planar waveguides 610 (e.g., along X-coordinate in the Cartesian axis for display 201, above).

More generally, some embodiments may include a double, triple, or higher order stack of planar waveguides 610, with an MLS array including as many rows 607 of micro-lenses. Output couplers 615-1 and 615-2 (hereinafter, collectively referred to as "output couplers 615") direct light beams 630 out of their respective planar waveguides 610 into an eyebox (not included in the figure, for ease of illustration).

Figure 7A:
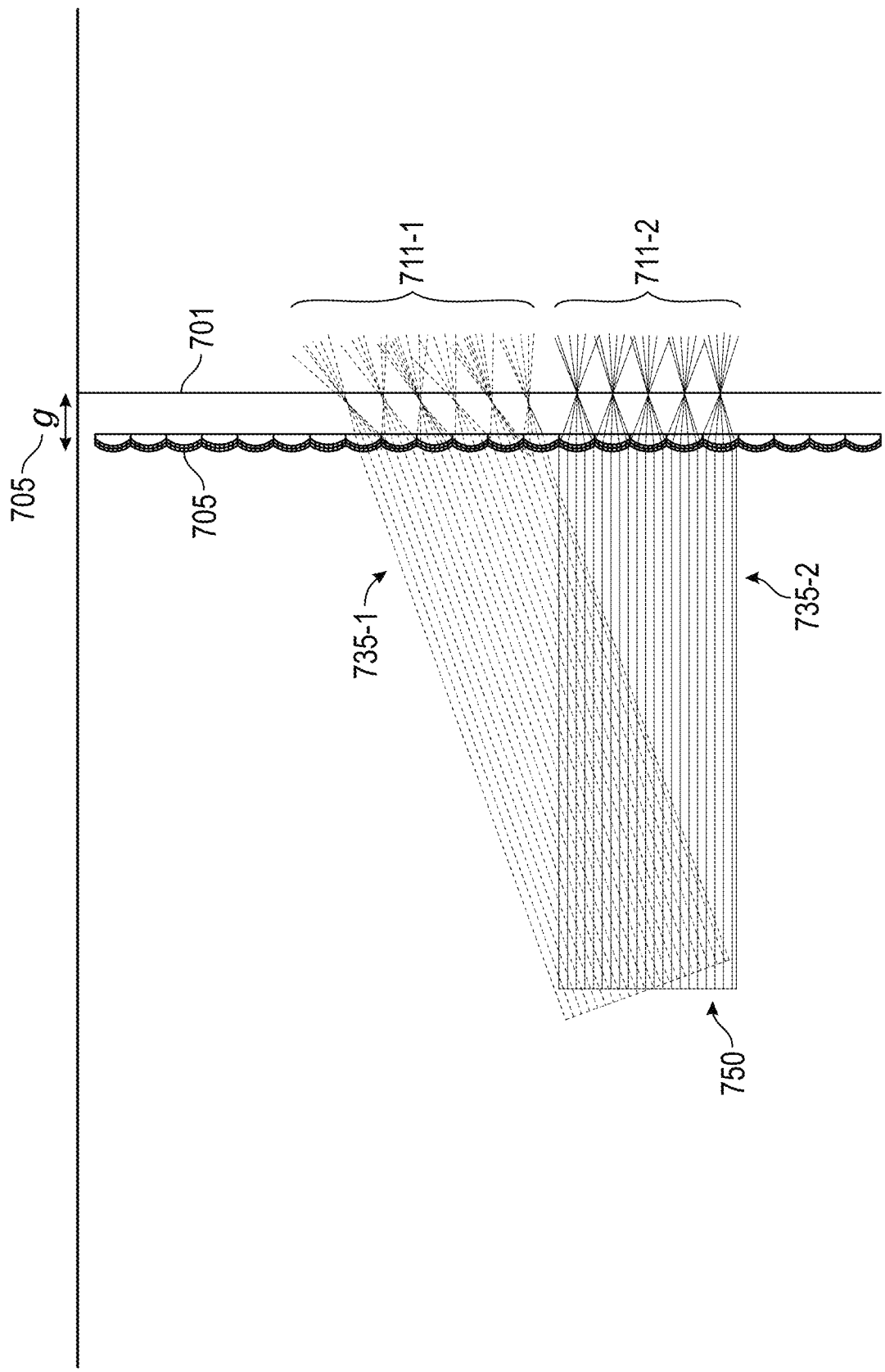
FIGS. 7A-7B illustrate a micro-lens strip for coupling light from a display through an eyebox in a headset for enhanced reality applications, according to some embodiments.

FIG. 7A illustrates an MLS 705 for coupling light beams 735-1 and 735-2 (hereinafter, collectively referred to as "light beams 735") from a display 701 through an eyebox 750 in a headset for enhanced reality applications (e.g., headset 10), according to some embodiments. Light beams 735 may be generated by pixel segments 711-1 and 711-2 (hereinafter, collectively referred to as "pixel segments 711"). In some embodiments, pixel segments 711 may include clusters of adjacent pixels, each segment including a continuous portion of the FOV of the image provided by display 701, at a given angle of view. A distance 720 ($g$) between MLS 705 and display 701 may be approximately equal to a focal length of each of the lenses in MLS 705, therefore beams 735 may be substantially collimated when passing through eyebox 750.

As can be seen in the figure, pixel segments 711 provide a view of different portions of the image at different angles (e.g., elemental images), through eyebox 750. When at least one set of beams from each of light beams 735 is incident in the pupil of the headset user (which may be anywhere within eyebox 750), a binocular (and more generally, stereoscopic) view of the image is generated. In some embodiments, display 701 is a light field display and pixel segments 711 are tailored, together with the optical specifications of MLS 705, including distance 720, to avoid cross-talk, wherein the same pixel on array 701 maps light beams 735 with two different angles that both reach eyebox 750.

Figure 7B:
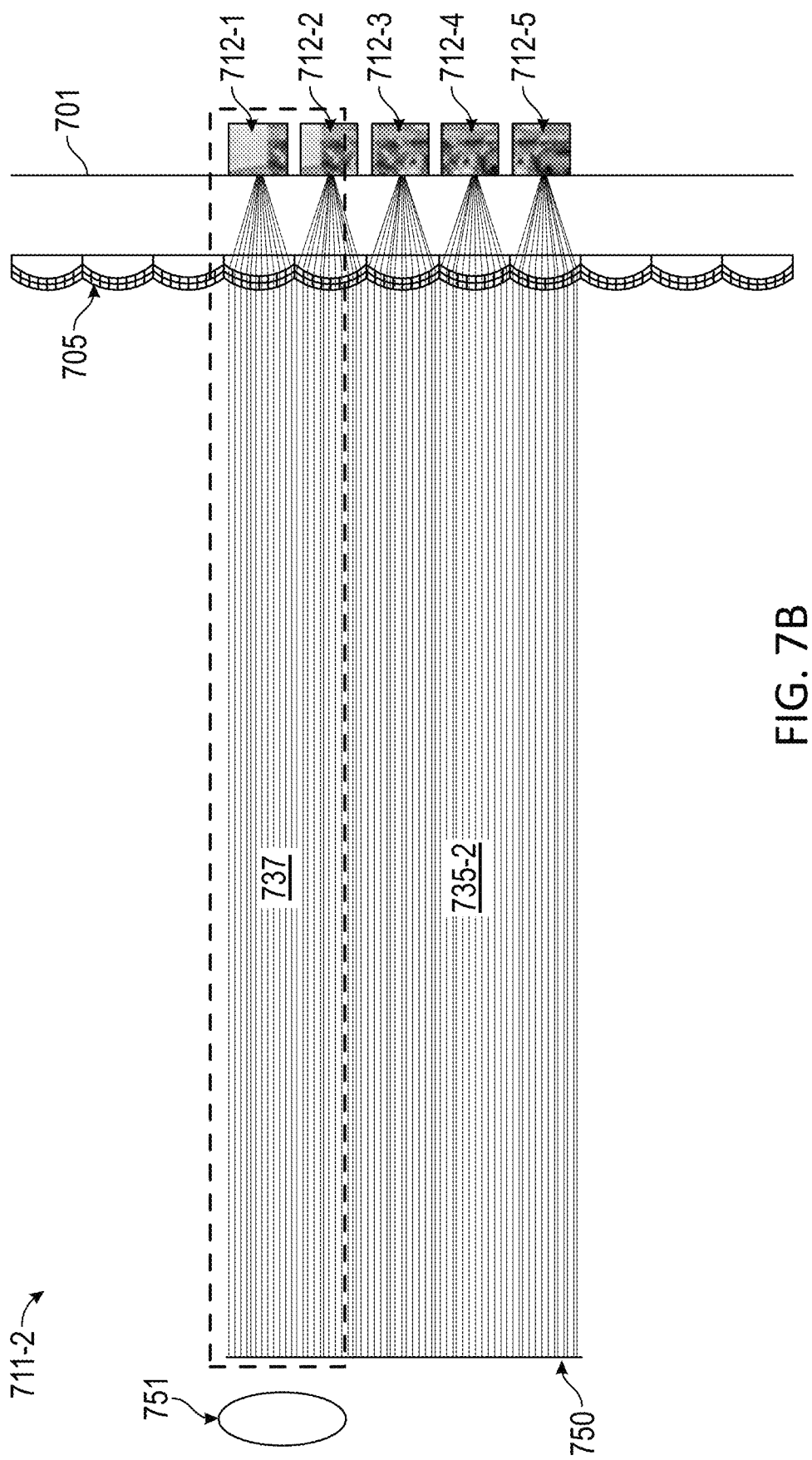

Moreover, in some embodiments, the headset may include an eye tracking tool that identifies the precise location of the user's pupil at a given time. In such configuration, the processor in the headset may select the one pixel from each of pixel segments 711 that target the given pupil location, and de-activate the other pixels in display 701 (whose light beams will be missing the user's pupil). This selective activation of pixels in display 701, which may be referred to as "pupil steering," may result in a more efficient power consumption of the headset FIG. 7B illustrates a detailed view of pixel segments 711-2 corresponding to different elemental images 712-1, 712-2, 712-3, 712-4 and 712-5 (hereinafter, collectively referred to as "elemental images 712"). The user's pupil 751 is in the upper part of eyebox 750, and accordingly, only the pixel segments 711-2 that provide a portion 737 of light beams 735-2 corresponding to elemental images 712-1 and 712-2, should be activated in such configuration. Note that elemental images 712-3 through 712-5 may be provided to pupil 751 from different pixel segments (e.g., pixel segment 711-1, or other, within display 701), such that the user still captures the entire FOV in the given pupil configuration, as desired.

In some embodiments, MLS 705 may include an active liquid crystal layer that may be actuated to compensate wave front errors produced by slight misalignment (e.g., lack of parallelism) between MLS 705 and display 701. Wave front errors may cause aberrations and ghost effects for the image viewed by the headset user.

Figure 8:
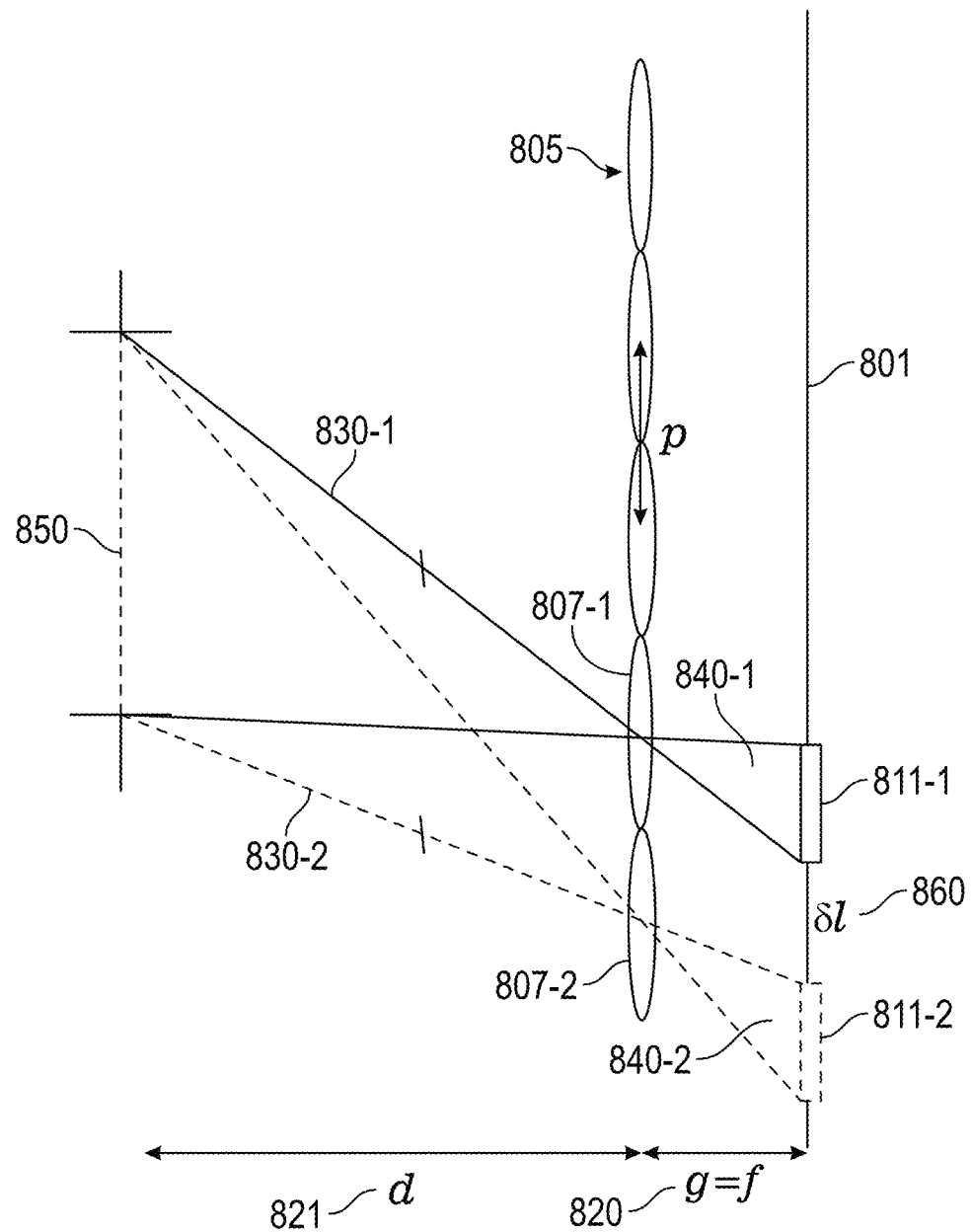
FIG. 8 illustrates an eyebox size in an enhanced reality device wherein a micro-lens strip couples light from two adjacent segments in a display, according to some embodiments.

FIG. 8 illustrates an eyebox 850 in an enhanced reality device wherein an MLS 805 couples light beams 830-1 and 830-2 (hereinafter, collectively referred to as "light beams 830") from two adjacent elemental images 811-1 and 811-2 (hereinafter, collectively referred to as "elemental images 811") in a display, according to some embodiments. Adjacent lenslets 807-1 and 807-2 (hereinafter, collectively referred to as "lenslets 807") service different angular frustums 840-1 and 840-2 (hereinafter, collectively referred to as "frustums 840") described by light beams 830 from each of elemental images 811, respectively. In some embodiments, frustums 840 may not be mutually exclusive, and may have some overlap in portions of the image provided by display 801. For example, when display 801 is a light field display, frustums 840 from adjacent elemental images 811, overlap to provide a large FOV through eyebox 850.

In some embodiments, given a gap 860 (81) between adjacent elemental images 811 may be selected, in combination with a distance 821 ($d$) and a focal length 820 ($g$), to avoid cross-talk, the size, D, of eyebox 850 is given by (where p is the center-to-center distance between lenslets in MLS 805):

$$D < p \cdot \frac{d+f}{f} \quad (1)$$

Eq. (1) illustrates that a short focal length for MLS 805 enables a wider eyebox 850 that can avoid cross-talk. This is desirable as a wider eyebox 850 allows more space for the moving of the user's pupil, and adjustment of the headset for different users.

The focal length of the MLS 807 and the pixel size $p_x$ of the display 801 determines the angular resolution of display 801 combined with MLS 805. The longer focal length f and smaller pixel size $p_x$, the higher the angular resolution. An expression for angular resolution, $\delta\Omega$, is $$\delta\Omega = 2 \cdot \text{atan}\left(\frac{p_x}{2f}\right), \quad (2)$$

Also, the size in the XY dimensions (cf display 201) is given by:

$$\Delta_y = 2 \cdot (d+f) \cdot \tan(\text{HFOV}_y) + D \quad (3.1)$$

$$\Delta_x = 2 \cdot f \cdot \tan(\text{HFOV}_x) \quad (3.2)$$

Eqs. (3) show that, in some embodiments, MLS 805 having a shorter focal length enables the use of a smaller display, which is desirable for a compact headset. As some exemplary embodiments, when MLS 805 has a focal length of ~25 mm and a pitch size for the micro-lenses of ~4.5 mm, the angular resolution $\delta\Omega$ is approximately 1.73 arcminutes for a display with 2000 PPI. Likewise, when MLS 805 has a focal length of ~13 mm and a pitch size of 3 mm, the angular resolution becomes coarser to about 3.3 arcminutes (2000 PPI). Accordingly, in some embodiments a shorter focal length, f, enables a more compact headset design, with a trade-off in angular resolution that can e compensated by using more refines pixel arrays (more PPI).

Figure 9:
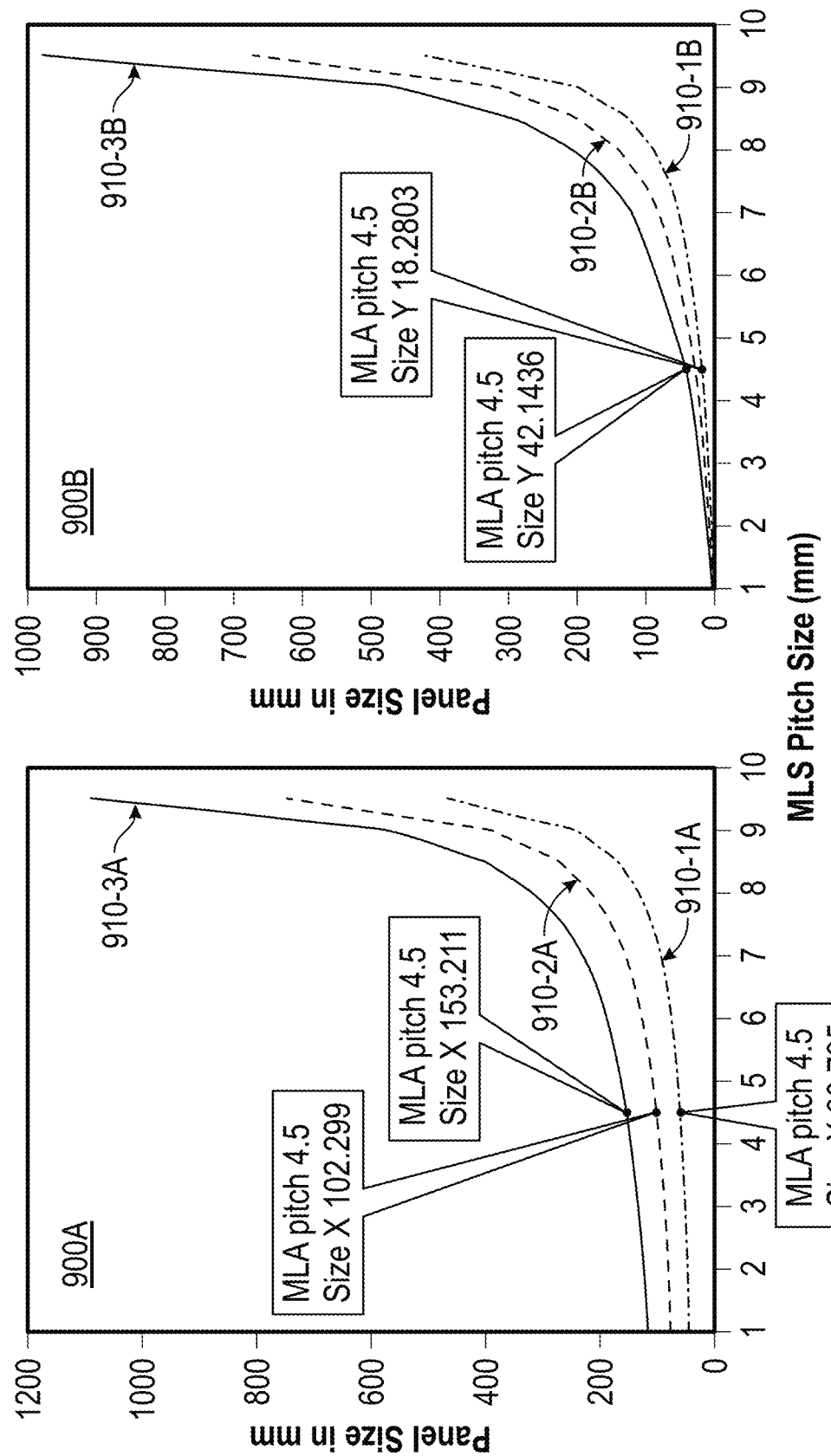
FIG. 9 illustrates a display size in the XY direction based on a pitch of a micro-lens strip in a headset for enhanced reality applications, according to some embodiments.

FIG. 9 illustrates a display size 900A in the Y-direction and a display size 900B in the X-direction (hereinafter, collectively referred to as "charts 900"), based on a pitch of a micro-lens strip in a headset for enhanced reality applications, according to some embodiments. The XY Cartesian frame is as indicated in display 201. The abscissae in charts 900 indicate a pitch of the micro-lenses in the MLS array (in millimeters, mm). The ordinates in charts 900 indicate a display size, also in mm. Charts 900 are the result of Eqs. (3), above. In some embodiments, it is desirable to reduce the pitch of the MLS array to reduce the dimension of the display and provide a more compact headset.

Curves 910-1A and 910-1B (hereinafter, collectively referred to as "curves 910-1") are associated with a 40° FOV in the Y and X direction, respectively. Curves 910-2A and 910-2B (hereinafter, collectively referred to as "curves 910-2") are associated with a 60° FOV in the Y and X direction, respectively. And curves 910-3A and 910-3B (hereinafter, collectively referred to as "curves 910-3") are associated with an 80° FOV in the Y and X direction, respectively. As illustrated, a wider FOV is associated with a larger display size. Accordingly, using MLS with a strip display as disclosed herein increases the FOV supported by the same eyebox size, because instead of having one display pixel support the entire eyebox at a specific FOV, now there are multiple pixels from different elemental images supporting the same eyebox. For example, for a 60° (H) and 40° (V) FOV, a panel size of 102 mm (Y-direction) by 18 mm (X-direction) may be provided, which is 2.4 times longer than a display without MLS and multiple elemental images. However, while the display may be larger, this configuration provides higher light efficiency in a larger eyebox.

Figure 10:
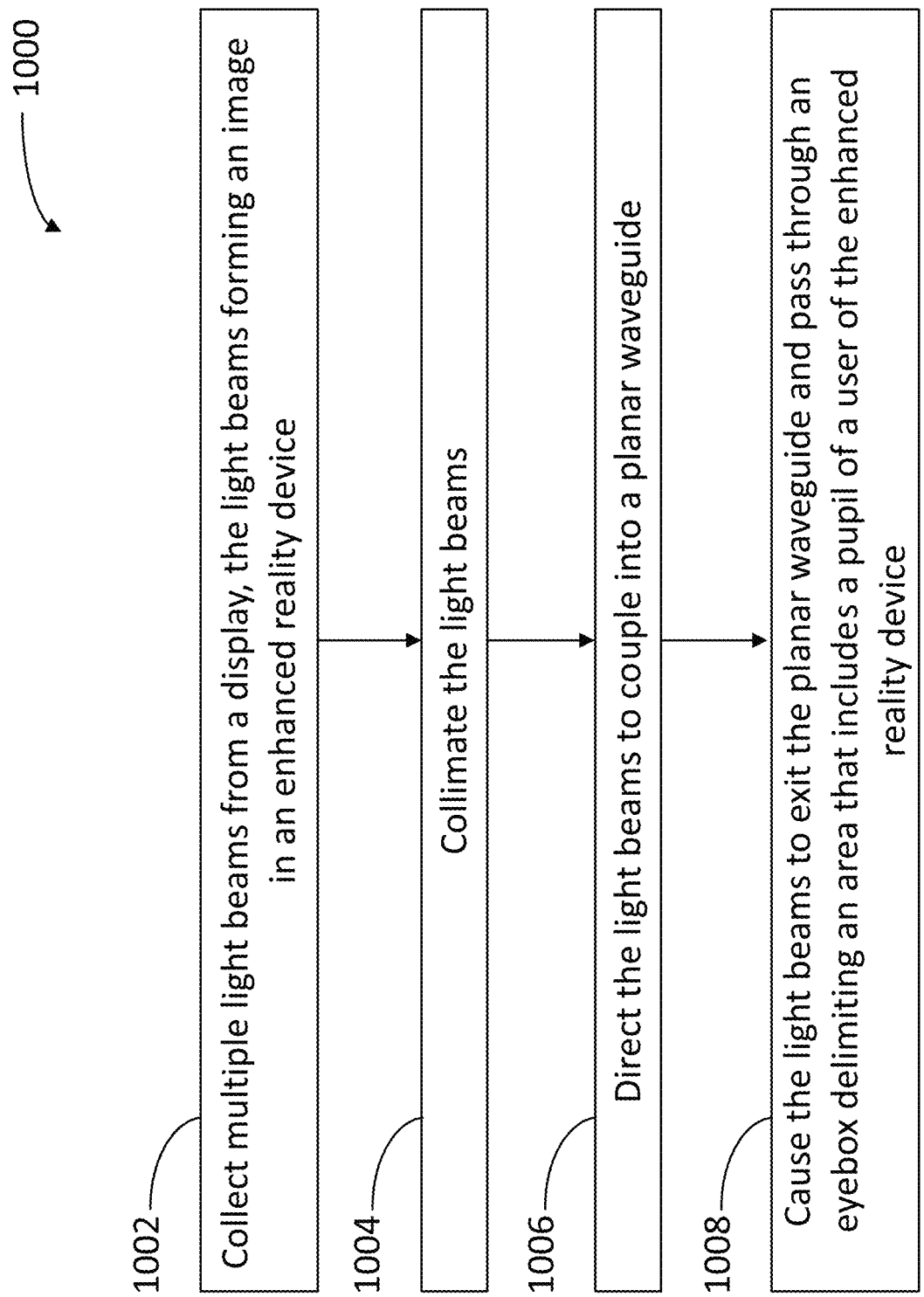
FIG. 10 is a flowchart illustrating steps in a method for coupling light from a display to a planar waveguide in a headset for enhanced reality applications, according to some embodiments.

FIG. 10 is a flowchart illustrating steps in a method 1000 for coupling light from a display to a planar waveguide in a headset for enhanced reality applications (e.g., headset 10), according to some embodiments. Accordingly, at least one of the steps in method 1000 may be performed by one or more processors executing instructions stored in a memory, and communicatively coupled to a network via a communications module (e.g., processor 112, memory 122, communications module 118, and network 150). An array of light emitters configured to generate multiple light beams to form an image, the image including a field of view (e.g., displays 101, 201, and light emitters 211). The headset may include a planar waveguide having an edge configured to receive multiple light beams from the array of light emitters (e.g., planar waveguides 210, 310, 410, 510, and 610), each light beam associated with a portion of the field of view. The headset may also include a lens array including multiple lenses linearly extended to overlap an edge portion of the planar waveguide, the lenses optically coupling the light beams into the planar waveguide (e.g., micro-lens arrays 205, 305, 405, 505, 605, 705, 805). In some embodiments, the headset may include one or more output couplers in the planar waveguide configured to direct the light beams into an eyebox, wherein the eyebox forms an area that includes a pupil of a viewer of the image (e.g., output couplers 215, eyeboxes 250, 750, and 850). A method consistent with embodiments disclosed herein may include at least one or more of the steps in method 1000 performed in different order, simultaneously, quasi-simultaneously, or overlapping in time.

Step 1002 includes collecting multiple light beams from a display, the light beams forming an image in an enhanced reality device. In some embodiments, step 1002 includes collecting different groups of light beams from different light emitters in the display, and directing the different groups of light beams through the eyebox at different angles, the different angles forming a wide field of view image for the user. In some embodiments, step 1002 includes selectively activating portions of the display according to an angle of incidence of the light beams through the eyebox.

Step 1004 includes collimating the light beams. In some embodiments, step 1004 includes placing the micro-lens array at a distance from the display that is approximately equal to a focal length of at least one of the lenses in the MLS.

Step 1006 includes directing the light beams to couple into a planar waveguide. In some embodiments, step 1006 includes activating the output couplers in the planar waveguide to direct the light beams out of the planar waveguide at an angle higher than a total reflection angle in the planar waveguide.

Step 1008 includes causing the light beams to exit the planar waveguide and pass through an eyebox delimiting an area that includes a pupil of a user of the enhanced reality device. In some embodiments, step 1008 includes ensuring that the light beams generated by a single light emitter pass through the eyebox at a single angle of incidence.

Hardware Overview

Figure 11:
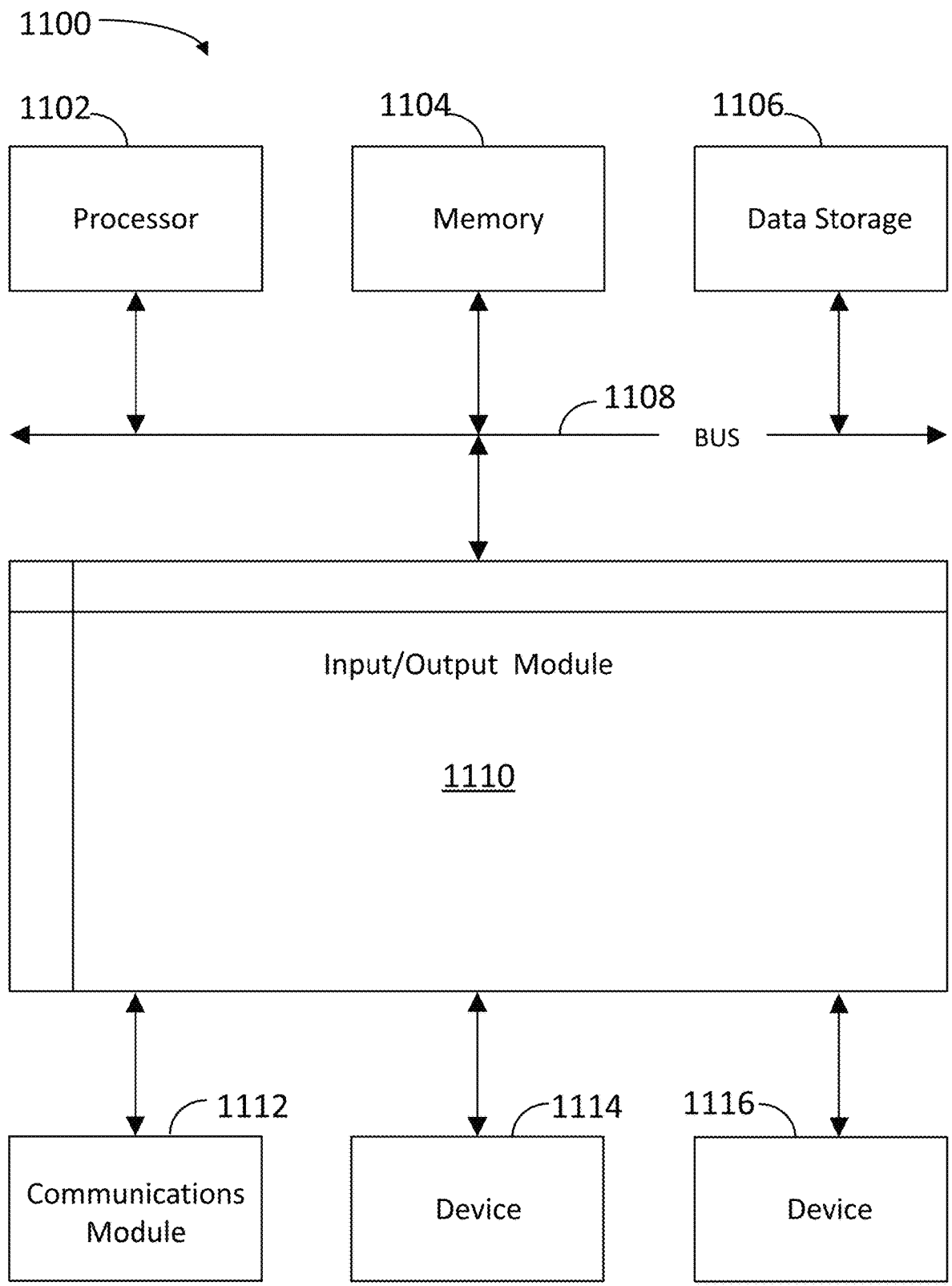
FIG. 11 illustrates a system to perform some of the steps in methods consistent with the present disclosure.

FIG. 11 is a block diagram illustrating an exemplary computer system 1100 with which headset 10 of FIG. 1, and method 1000 can be implemented. In certain aspects, computer system 1100 may be implemented using hardware or a combination of software and hardware, either in a dedicated server, or integrated into another entity, or distributed across multiple entities. Computer system 1100 may include a desktop computer, a laptop computer, a tablet, a phablet, a smartphone, a feature phone, a server computer, or otherwise. A server computer may be located remotely in a data center or be stored locally.

Computer system 1100 includes a bus 1108 or other communication mechanism for communicating information, and a processor 1102 (e.g., processor 112) coupled with bus 1108 for processing information. By way of example, the computer system 1100 may be implemented with one or more processors 1102. Processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 can include, in addition to hardware, code that creates an execution environment for the computer program in question, e.g., code that constitutes processor firmware, a protocol stack, a database management system, an operating system, or a combination of one or more of them stored in an included memory 1104 (e.g., memory 122), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1108 for storing information and instructions to be executed by processor 1102. The processor 1102 and the memory 1104 can be supplemented by, or incorporated in, special purpose logic circuitry.

The instructions may be stored in the memory 1104 and implemented in one or more computer program products, e.g., one or more modules of computer program instructions encoded on a computer-readable medium for execution by, or to control the operation of, the computer system 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled with bus 1108 for storing information and instructions. Computer system 1100 may be coupled via input/output module 1110 to various devices. Input/output module 1110 can be any input/output module. Exemplary input/output modules 1110 include data ports such as USB ports. The input/output module 1110 is configured to connect to a communications module 1112. Exemplary communications modules 1112 include networking interface cards, such as Ethernet cards and modems. In certain aspects, input/output module 1110 is configured to connect to a plurality of devices, such as an input device 1114 and/or an output device 1116. Exemplary input devices 1114 include a keyboard and a pointing device, e.g., a mouse or a trackball, by which a consumer can provide input to the computer system 1100. Other kinds of input devices 1114 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1116 include display devices, such as an LCD (liquid crystal display) monitor, for displaying information to the consumer.

According to one aspect of the present disclosure, headset 10 can be implemented, at least partially, using a computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network.

The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1100 can include clients and servers. A client and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1102 for execution. Such a medium may take many forms, including, but not limited to, non-volatile media, volatile media, and transmission media. Non-volatile media include, for example, optical or magnetic disks, such as data storage device 1106. Volatile media include dynamic memory, such as memory 1104. Transmission media include coaxial cables, copper wire, and fiber optics, including the wires forming bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, comprising:
   an array of light emitters configured to generate multiple light beams to form an image, the image having a field of view;
   a planar waveguide having an edge configured to receive the multiple light beams from the array of light emitters, each light beam associated with a portion of the field of view;
   a lens array comprising multiple lenses linearly extended to overlap an edge portion of the planar waveguide, the lenses optically coupling the light beams into the planar waveguide; and
   one or more output couplers in the planar waveguide configured to direct the light beams into an eyebox, wherein the eyebox forms an area that includes a pupil of a viewer of the image, wherein:
   the planar waveguide comprises a first slab waveguide adjacent to a second slab waveguide, and the lens array comprises a first row of lenses overlapping a first portion of the array of light emitters and an edge portion of the first slab waveguide, and a second row of lenses overlapping a second portion of the array of light emitters and an edge portion of the second slab waveguide, and
   the first portion of the array of light emitters provides a first elemental image from a different angle of view than a second elemental image provided by the second portion of the array of light emitters.

2. The device of claim 1, wherein the lens array is disposed at a distance from the array of light emitters equal to a pre-selected focal length of the lenses in the lens array.

3. The device of claim 1, wherein the lens array comprises unique, freeform lenslets without rotational symmetry.

4. The device of claim 1, wherein the lens array includes a stack of multiple lenslet arrays in series, wherein a light beam in a single lenslet channel encounters more than two optical surfaces.

5. The device of claim 1, wherein the lens array has a pitch separating two adjacent lenses, the pitch selected to provide a continuous field of view to avoid a cross-talk at the eyebox between two light beams originating at different angles from a same pixel.

6. The device of claim 1, wherein the light beams from different lenses in the lens array correspond to different portions of the field of view, and an addition of the light beams from the lenses in the lens array through the eyebox comprises a continuous sweep of the field of view for the viewer of the image.

7. The device of claim 1, wherein the array of light emitters forms a curved surface, and the edge portion of the planar waveguide and the lens array are curved parallel to the array of light emitters, and wherein the curved surface includes one of a curved array of flat, segmented pixel sub-arrays, or a continuous, curved array.

8. The device of claim 1, wherein the lens array is etched on the edge portion of the planar waveguide.

9. The device of claim 1, wherein the lens array includes a liquid crystal configured to actively correct a wavefront error induced by an imperfection in the planar waveguide.

10. The device of claim 1, wherein a light emitter in the array of light emitters is selectively activated when a light beam generated by the light emitter is directed to a position of the pupil of the viewer within the eyebox.

11. The device of claim 1, wherein a first light emitter generating a first light beam providing a first portion of the field of view and a second light emitter generating a second light beam providing a second portion of the field of view are activated simultaneously to provide a stereoscopic view of the image when the first light beam and the second light beam are directed to a position of the pupil of the viewer within the eyebox.

12. A headset for enhanced reality, comprising:
one or more processors;
a memory storing multiple instructions;
an array of light emitters configured to generate multiple light beams to form an image, the image comprising a field of view;
a planar waveguide having an edge configured to receive the multiple light beams from the array of light emitters, each light beam associated with a portion of the field of view;
a lens array comprising multiple lenses linearly extended to overlap an edge portion of the planar waveguide, the lenses optically coupling the light beams into the planar waveguide; and
one or more output couplers in the planar waveguide configured to direct the light beams into an eyebox, wherein the eyebox forms an area that includes a pupil of a viewer of the image, wherein:
the planar waveguide comprises a first slab waveguide adjacent to a second slab waveguide, and the lens array comprises a first row of lenses overlapping a first portion of the array of light emitters and an edge portion of the first slab waveguide, and a second row of lenses overlapping a second portion of the array of light emitters and an edge portion of the second slab waveguide, the second portion of the array of light emitters different from the first portion of light emitters,
the first portion of the array of light emitters provides a first elemental image from a different angle of view than a second elemental image provided by the second portion of the array of light emitters, and
the one or more processors execute the instructions to cause the array of light emitters to generate the light beams, and the output couplers in the planar waveguide to direct the light beams into the eyebox.

13. The headset for enhanced reality of claim 12, wherein the one or more processors execute the instructions to collect different groups of light beams from different light emitters in the array of light emitters, and to cause the output couplers to direct the different groups of light beams through the eyebox at different angles, the different angles forming a wide field of view image for the viewer of the image.

14. The headset for enhanced reality of claim 12, wherein the one or more processors execute the instructions to selectively activate portions of the array of light emitters according to an angle of incidence of the multiple light beams through the eyebox.

15. The headset for enhanced reality of claim 12, wherein the one or more processors cause the output couplers to direct light beams generated by a single light emitter to pass through the eyebox at a single angle of incidence.

16. A method, comprising:
collecting multiple light beams from a display, the light beams forming an image in an enhanced reality device;
collimating the multiple light beams; and
directing the multiple light beams to couple into a planar waveguide, wherein the planar waveguide comprises a first slab waveguide adjacent to a second slab waveguide, and collimating the multiple light beams comprises:
collimating a first portion of the multiple light beams forming a first elemental image with a first row of lenses into an edge portion of the first slab waveguide,
collimating a second portion of the multiple light beams forming a second elemental image into an edge portion of the second slab waveguide, wherein the first elemental image has a different angle of view than the second elemental image, and
causing the multiple light beams to exit the planar waveguide and pass through an eyebox delimiting an area that includes a pupil of a user of the enhanced reality device.

17. The method of claim 16, wherein collecting the multiple light beams from a display comprises collecting different groups of light beams from different light emitters in the display, and directing the different groups of light beams through the eyebox at different angles, the different angles forming a wide field of view image for the user.

18. The method of claim 16, wherein collecting the multiple light beams from a display comprises selectively activating portions of the display according to an angle of incidence of the multiple light beams through the eyebox.

19. The method of claim 16, wherein causing the multiple light beams to exit the planar waveguide and pass through the eyebox comprises ensuring that the light beams generated by a single light emitter pass through the eyebox at a single angle of incidence.

* * * * *